UNITED STATES PATENT OFFICE.

JOHN H. BROWN, OF CHICAGO, ILLINOIS, ASSIGNOR OF ONE-HALF TO FRANK C. SCHOENTHALER, OF SAME PLACE.

COMPOSITION OF MATTER TO COOL AND REDUCE FRICTION IN BEARINGS.

SPECIFICATION forming part of Letters Patent No. 343,943, dated June 15, 1886.

Application filed March 30, 1886. Serial No. 197,111. (No specimens.)

*To all whom it may concern:*

Be it known that I, JOHN H. BROWN, a citizen of the United States, residing in Chicago, county of Cook, and State of Illinois, have invented a new and useful Composition of Matter to Cool and Reduce Friction in Bearings of Various Kinds, and particularly car-axle bearings, of which the following is a specification.

My composition consists of the following ingredients, combined in substantially the proportions stated, viz: crystallized nitrate of potash, one pound; crystallized carbonate of soda, one pound; plumbago, four ounces. These ingredients are first powdered, and then thoroughly mixed.

In using the above-named composition for car-axles it is first sprinkled in the box, and enough water is then introduced to saturate the composition to reduce it to a pasty mass, though in such use or when used for other bearings the composition may by the addition of water be reduced to a paste before applying it to the bearing.

While the three ingredients named are found to be the most desirable, the essential ingredients of my composition are carbonate of soda and plumbago in substantially the proportions named, for I have satisfactorily demonstrated that by combining these two materials a desirable cooling and anti-friction effect on bearings is attained, though not quite to the same degree as by the addition thereto of the nitrate of potash.

This composition may be used instead of the usual lubricator; but it is especially designed to be used in connection with—that is, added to—a grease lubricant in a bearing liable to become or already heated, and I have practically demonstrated that its introduction into a hot box of a railroad-car not only cools the same while the car is running, but prevents the box from afterward heating, even though the journal may have been at a red heat at the time of the introduction of my composition.

What I claim, and desire to secure by Letters Patent of the United States, is—

1. The herein-described composition of matter to be used as a cooling and anti-friction material, consisting of a base composed of carbonate of soda and plumbago, in the proportions specified.

2. The herein-described composition of matter to be used for cooling and reducing friction in bearings, consisting of nitrate of potash, carbonate of soda, and plumbago, in the proportions specified.

JOHN H. BROWN.

Witnesses:
W. W. ELLIOTT,
JNO. G. ELLIOTT.